(12) United States Patent
McCaffrey

(10) Patent No.: US 10,590,780 B2
(45) Date of Patent: Mar. 17, 2020

(54) ENGINE COMPONENT HAVING SUPPORT WITH INTERMEDIATE LAYER

(71) Applicant: UNITED TECHNOLOGIES CORPORATION, Hartford, CT (US)

(72) Inventor: Michael G. McCaffrey, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 794 days.

(21) Appl. No.: 14/782,014

(22) PCT Filed: Apr. 1, 2014

(86) PCT No.: PCT/US2014/032453
§ 371 (c)(1),
(2) Date: Oct. 2, 2015

(87) PCT Pub. No.: WO2014/165467
PCT Pub. Date: Oct. 9, 2014

(65) Prior Publication Data
US 2016/0040539 A1    Feb. 11, 2016

Related U.S. Application Data

(60) Provisional application No. 61/807,412, filed on Apr. 2, 2013.

(51) Int. Cl.
*F01D 5/30*    (2006.01)
*F01D 5/14*    (2006.01)
*F01D 5/28*    (2006.01)
*C04B 37/00*   (2006.01)
*B28B 1/30*    (2006.01)
(Continued)

(52) U.S. Cl.
CPC .................. *F01D 5/30* (2013.01); *B28B 1/30* (2013.01); *C04B 37/005* (2013.01); *F01D 5/02* (2013.01);
(Continued)

(58) Field of Classification Search
CPC ........ F01D 5/3084; F01D 5/3092; F01D 5/30; F01D 5/282; F01D 5/284; F01D 5/147; F01D 5/3007; F05D 2240/80
See application file for complete search history.

(56) References Cited

U.S. PATENT DOCUMENTS 3,753,794 A * 8/1973 Paulonis .............. B23K 35/004
148/279
4,045,149 A    8/1977 Ravenhall
(Continued)

FOREIGN PATENT DOCUMENTS

WO     2014099102 A1    6/2014

OTHER PUBLICATIONS

J. Safari, S. Nategh, "On the heat treatment of Rene-80 nickel-base superalloy," 2006, Journal of Materials Processing Technology, 176, pp. 240-250.*

(Continued)

*Primary Examiner* — Steven M Sutherland
*Assistant Examiner* — Thuyhang N Nguyen
(74) *Attorney, Agent, or Firm* — Carlson, Gaskey & Olds, P.C.

(57) ABSTRACT

Disclosed is a gas turbine engine component, and a method for forming the component. The component includes a first portion, a second portion formed separately from the first portion, and an intermediate layer provided between the first portion and the second portion.

18 Claims, 2 Drawing Sheets

(51) Int. Cl.
*F01D 5/02* (2006.01)
*F01D 9/04* (2006.01)
*F02C 3/04* (2006.01)

(52) U.S. Cl.
CPC ............. *F01D 5/147* (2013.01); *F01D 5/282* (2013.01); *F01D 5/284* (2013.01); *F01D 5/3007* (2013.01); *F01D 5/3084* (2013.01); *F01D 5/3092* (2013.01); *F01D 9/041* (2013.01); *F02C 3/04* (2013.01); *C04B 2237/08* (2013.01); *C04B 2237/086* (2013.01); *C04B 2237/16* (2013.01); *C04B 2237/365* (2013.01); *C04B 2237/38* (2013.01); *C04B 2237/385* (2013.01); *F05D 2220/32* (2013.01); *F05D 2230/30* (2013.01); *F05D 2230/312* (2013.01); *F05D 2240/80* (2013.01); *F05D 2300/6033* (2013.01); *Y02T 50/672* (2013.01)

(56) References Cited

U.S. PATENT DOCUMENTS

| | | | | |
|---|---|---|---|---|
| 5,312,696 | A | * | 5/1994 | Beers ...................... B32B 15/01 416/241 R |
| 5,318,406 | A | * | 6/1994 | Bardes ................... B23P 15/04 29/889.21 |
| 5,725,355 | A | * | 3/1998 | Crall ....................... F01D 5/147 416/229 A |
| 8,926,284 | B2 | * | 1/2015 | Dimelow .............. F01D 5/3092 416/219 R |
| 2007/0148000 | A1 | | 6/2007 | Marusko et al. |
| 2010/0284816 | A1 | * | 11/2010 | Propheter-Hinckley .................... F01D 5/3007 416/241 B |
| 2011/0000183 | A1 | * | 1/2011 | Dimelow .............. F01D 5/3092 60/39.091 |
| 2011/0297344 | A1 | | 12/2011 | Campbell et al. |
| 2012/0051920 | A1 | * | 3/2012 | McCaffrey .............. F01D 5/282 416/219 R |
| 2012/0163985 | A1 | | 6/2012 | Darkins, Jr. et al. |

OTHER PUBLICATIONS

International Preliminary Report on Patentability for International Application No. PCT/US2014/032453 dated Oct. 15, 2015.
Supplementary European Search Report for European Application No. 14778857.4 dated Nov. 8, 2016.

* cited by examiner

ENGINE COMPONENT HAVING SUPPORT WITH INTERMEDIATE LAYER

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. Turbine blades are known to include an airfoil section, over which the hot combustion gases flow, and a root attached to a rotatable disc. A support, or platform, is typically rigidly attached (e.g., bolted) adjacent to the turbine blade near the root, or is integrally formed with the turbine blade (e.g., by casting or molding).

SUMMARY

In one exemplary embodiment, a gas turbine engine includes a compressor section, a combustor section, and a turbine section, the turbine section including a stationary stage and a rotating stage. Further included is a component provided in one of the stationary stage and the rotating stage. The component includes a first portion, a second portion formed separately from the first portion, and an intermediate layer provided between the first portion and the second portion.

In a further embodiment of any of the above, the component is a turbine blade, and is provided in the rotating stage of the turbine section.

In a further embodiment of any of the above, the turbine section includes a high pressure section and a low pressure section, the turbine blade being provided in the high pressure section.

In a further embodiment of any of the above, the turbine blade is made of a ceramic matrix composite (CMC) material.

In a further embodiment of any of the above, the second portion of the turbine blade is a platform.

In a further embodiment of any of the above, an outer face of the platform directly abuts an inner face of a slot of a rotor disc.

In a further embodiment of any of the above, the second portion is at least partially moveable relative to the first portion of the component during operation of the gas turbine engine.

In another exemplary embodiment, a gas turbine engine component includes a first portion, a second portion formed separately from the first portion, and an intermediate layer provided between the first portion and the second portion.

In a further embodiment of any of the above, the component is a turbine blade, and wherein the first portion includes an airfoil section and a root of the turbine blade.

In a further embodiment of any of the above, the second portion includes a platform of the turbine blade.

In a further embodiment of any of the above, the first portion is at least partially moveable relative to the second portion of the component.

In an exemplary method forming a component for a gas turbine engine, a first portion of the component is formed. An intermediate layer is then provided over the component. Then, a second portion of the component is formed over the intermediate layer.

In a further embodiment of any of the above, the component is a turbine blade.

In a further embodiment of any of the above, the first portion of the component includes an airfoil section and a root, and the second portion of the component is a supporting structure configured to support the first portion.

In a further embodiment of any of the above, the intermediate layer is provided over at least a portion of the root.

In a further embodiment of any of the above, the intermediate layer is at least partially de-bonded from the root during operation of the gas turbine engine.

In a further embodiment of any of the above, the airfoil section and root are formed by molding ceramic matrix composite (CMC) material.

In a further embodiment of any of the above, the second portion of the component includes a platform.

In a further embodiment of any of the above, the platform is formed by molding ceramic matrix composite (CMC) material.

In a further embodiment of any of the above, the intermediate layer includes one of carbon, boron nitride, and silicon.

These and other features of the present disclosure can be best understood from the following drawings and detailed description.

BRIEF DESCRIPTION OF THE DRAWINGS

The drawings can be briefly described as follows.

DETAILED DESCRIPTION

Figure 1:
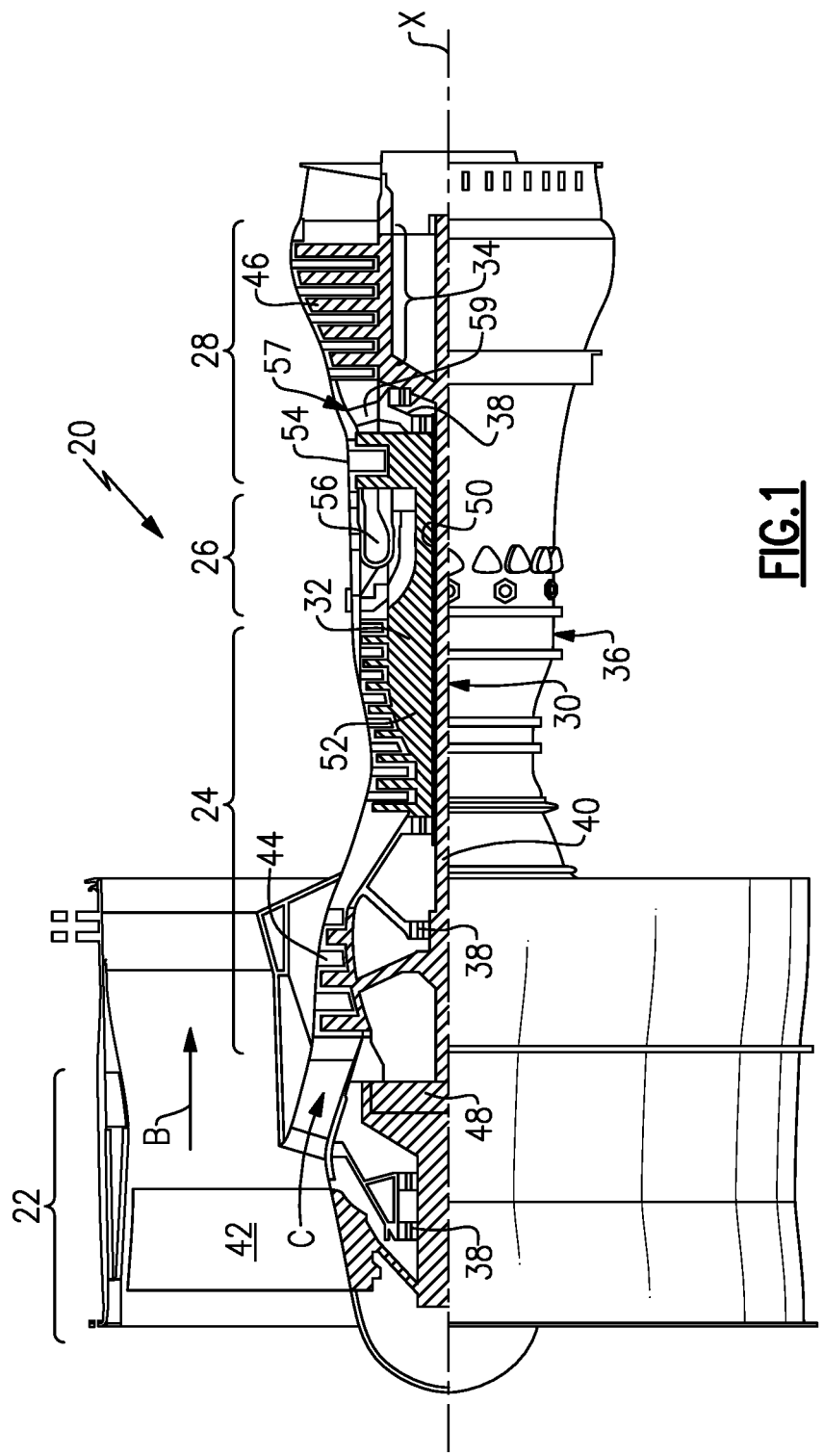
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines, such as in the context of wind turbines.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed," as disclosed herein according to one non-limiting embodiment, is less than about 1150 ft/second.

Figure 2:
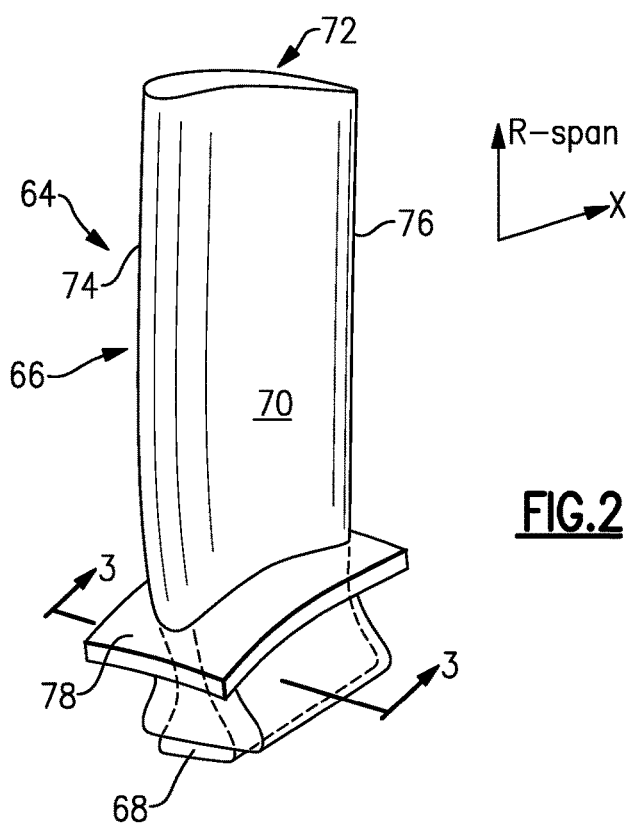
FIG. 2 is a perspective view of a turbine blade.
Figure 3:
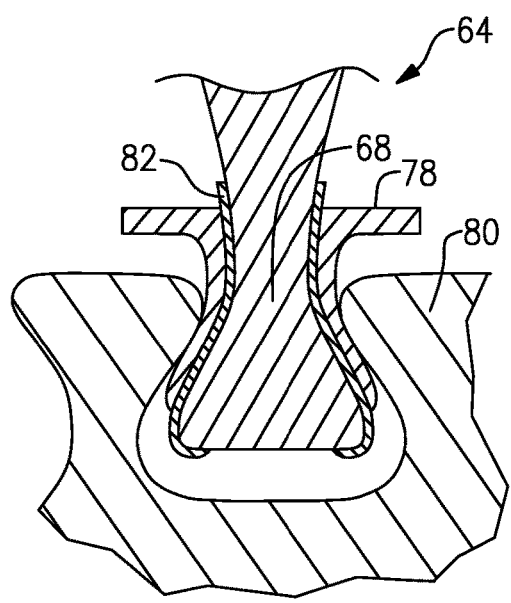
FIG. 3 is a sectional view of the turbine blade of FIG. 2, taken along line 3-3, with the turbine blade arranged relative to a disc in an initial condition.
Figure 4:
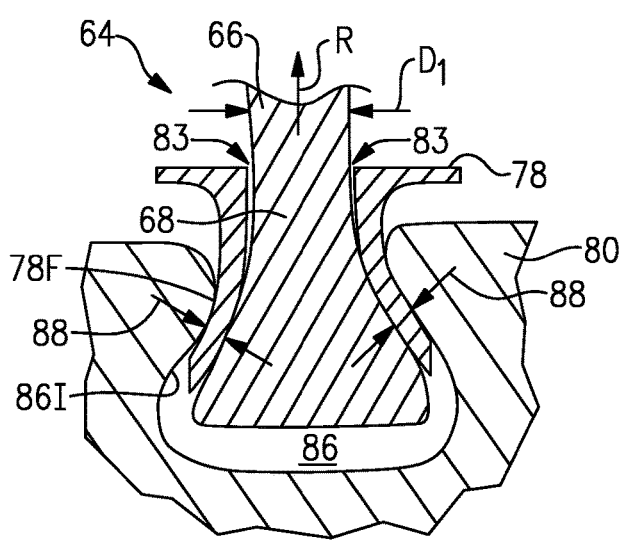
FIG. 4 is a view similar to FIG. 3 showing the arrangement in an operational condition.

Turning now to FIGS. 2-4, the disclosed assembly can be used in various portions of a gas turbine engine. For exemplary purposes, a turbine blade 64 is described. It should be understood that this disclosure could apply to compressor blades, as well as stator vanes and fan blades.

Referring to FIG. 2, an example turbine blade 64 includes an airfoil section 66, a root 68, and a support, here a platform, 78. In this example the root 68 is a dove tail root. Other example roots, such as fir tree roots, could be used, however. The airfoil section 66 includes a pressure side 70 and a suction side 72 provided between a leading edge 74 and a trailing edge 76. In this example, the platform 78 is provided over at least a portion of the root 68. As will be explained in detail below, the platform 78 is a one-piece structure and is formed separately from the airfoil section 66 and the root 68.

FIG. 3 illustrates a sectional view taken along line 3-3, showing the turbine blade 64 arranged relative to a disc 80 of a turbine section. As illustrated, an intermediate layer 82 is provided between the root 68 and the platform 78. During operation of the gas turbine engine 20, it is possible that a portion of the intermediate layer 82 will be worn away, and become de-bonded from the root 68 and the platform 78. FIG. 3 illustrates an initial condition before any wearing of the intermediate layer 82 has occurred. In the initial condition the intermediate layer 82 prevents the platform 78 from directly contacting the root 68.

In one example, the intermediate layer has a thickness of between 0.005 to 0.0005 inches (0.00127 to 0.0127 cm). Accordingly, the intermediate layer 82 is relatively thin such that the dimensions of the platform 78 substantially correspond to those of the root 68.

FIG. 4 illustrates the assembly of FIG. 3 during operation of the gas turbine engine 20. During operation, the airfoil section 66 and the root 68 undergo a radial pull force, illustrated at R. This radial pull force R causes the airfoil section 66 to contract in direction D1. In at least some circumstances, however, the platform 78 does not experience the same radial pull force R, and thus does not contract in the same way as the airfoil section 66. Because the platform 78 is formed separately from the airfoil section 66 and the root 68, the airfoil section 66 and the root 68 are allowed to move relative to the platform 78. Thus, a gap, illustrated at 83, can be formed between the platform 78 and the root 68. Even though the gap 83 exists, the root 68 is still sufficiently supported by the slot 86 of the disc 80, however. In the illustrated example, an inner face 86I of the slot 86 directly abuts the outer face 78F of the platform 78. The platform 78, in turn, abuts the root 68 either directly or by way of the intermediate layer 82 (if present). The turbine blade 64 is thus loaded into the disc as illustrated at 88.

Because the platform 78 does not experience the same forces as the remainder of the turbine blade 64, this relative movement reduces the stress on the platform 78, and thus in turn reduces deflections of the platform 78. Further, cracks that may form in the platform 78 tend not to propagate to the root 68, which tends to prevent damage to the airfoil section 66 and the root 68.

The intermediate layer 82 may be made of carbon, boron nitride, silicon, or another suitable applied material. The airfoil section 66, the root 68, and the platform section 78 can be made from ceramic matrix composite (CMC) materials. As is known in the art, a CMC material is one that includes fibers (such as carbon, silicon carbide or glass fibers, as example) supported within a ceramic matrix.

As mentioned above, the airfoil section 66 and the root 68 are formed separately from the platform section 78 to allow for relative movement therebetween. In one example method, the airfoil section 66 and root 68 are first formed by molding a CMC material (e.g., a plurality of CMC fabric sheets) into a desired shape. Next, the intermediate layer 82 is provided over the root 68. In one example, the intermediate layer 82 is sprayed onto the root 68. The platform 78, also formed of a CMC material (e.g., a plurality of CMC fabric sheets) is then provided over the intermediate layer 82. The entire assembly, including the formed airfoil 66 section and root 68, the intermediate layer 82, and the platform 78 is then molded. The final molded product can be further machined as necessary. Because the turbine blade 64 is formed of a CMC material, it is suitable for use in the high pressure turbine section 54, however this disclosure is not limited to a particular section of the gas turbine engine 20.

As mentioned above, in some examples it is expected that the intermediate layer 82 will wear, and become at least partially de-bonded from the root 68 during operation of the gas turbine engine 20. In another example, the intermediate layer 82 can be selected of a material (e.g., a glass) such that the intermediate layer 82 is de-bonded from the root 68 during molding process.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
a compressor section, a combustor section, and a turbine section, the turbine section including a stationary stage and a rotating stage;
a component provided in one of the stationary stage and the rotating stage, the component including a first portion, wherein the first portion includes an airfoil section and a root of a turbine blade, a second portion formed separately from the first portion and at least partially disposed radially outward of a rotor disc of the turbine section, and an intermediate layer provided between the first portion and the second portion, wherein, in an initial condition before any wear or de-bonding of the intermediate layer, the first portion abuts the second portion indirectly via the intermediate layer at a location, and wherein, after the initial condition, the intermediate layer wears and becomes de-bonded from the first portion at least at the location such that the first portion directly abuts the second portion at the location.

2. The gas turbine engine as recited in claim 1, wherein the component is the turbine blade, and is provided in the rotating stage of the turbine section.

3. The gas turbine engine as recited in claim 2, wherein the turbine section includes a high pressure section and a low pressure section, the turbine blade being provided in the high pressure section.

4. The gas turbine engine as recited in claim 2, wherein the turbine blade is made of a ceramic matrix composite (CMC) material.

5. The gas turbine engine as recited in claim 2, wherein the second portion of the turbine blade is a platform.

6. The gas turbine engine as recited in claim 5, wherein an outer face of the platform directly abuts an inner face of a slot of the rotor disc.

7. The gas turbine engine as recited in claim 1, wherein the second portion is at least partially moveable relative to the first portion of the component during operation of the gas turbine engine.

8. The gas turbine engine as recited in claim 1, wherein, in the initial condition, the intermediate layer prevents the first portion from directly contacting the second portion.

9. The gas turbine engine as recited in claim 8, wherein, in the initial condition, the intermediate layer has a thickness between 0.005 to 0.0005 inches (0.00127 to 0.0127 cm).

10. A gas turbine engine component, comprising:
a first portion, wherein the first portion includes an airfoil section and a root of a turbine blade;
a second portion formed separately from the first portion, wherein the second portion includes a platform of the turbine blade, the second portion at least partially disposed radially outward of a rotor disc of a turbine section; and
an intermediate layer provided between the first portion and the second portion, wherein, in an initial condition before any wear or de-bonding of the intermediate layer, the first portion abuts the second portion indirectly via the intermediate layer at a location, and wherein, after the initial condition, the intermediate layer wears and becomes de-bonded from the first portion at least at the location such that the first portion directly abuts the second portion at the location.

11. The gas turbine engine as recited in claim 10, wherein the first portion is at least partially moveable relative to the second portion of the component.

12. A method of forming a component for a gas turbine engine comprising:
forming a first portion of the component;
providing an intermediate layer over the component; and
forming a second portion of the component over the intermediate layer, wherein the first portion of the component includes an airfoil section and a root of a turbine blade, and the second portion of the component is a supporting structure configured to support the first portion and includes a platform, the second portion at least partially disposed radially outward of a rotor disc of a turbine section, and wherein, in an initial condition before any wear or de-bonding of the intermediate layer, the first portion abuts the second portion indirectly via the intermediate layer at a location, and wherein, after the initial condition, the intermediate layer wears and becomes de-bonded from the first portion at least at the location such that the first portion directly abuts the second portion at the location.

13. The method as recited in claim 12, wherein the component is a turbine blade.

14. The method as recited in claim 12, wherein the intermediate layer is provided over at least a portion of the root.

15. The method as recited in claim 12, wherein the airfoil section and root are formed by molding ceramic matrix composite (CMC) material.

16. The method as recited in claim 12, wherein the platform is formed by molding ceramic matrix composite (CMC) material.

17. The method as recited in claim 16, wherein the intermediate layer includes one of carbon, boron nitride, and silicon.

18. A gas turbine engine, comprising:
a compressor section, a combustor section, and a turbine section, the turbine section including a stationary stage and a rotating stage;
a component provided in one of the stationary stage and the rotating stage, the component including a first portion, a second portion formed separately from the first portion, and an intermediate layer provided between the first portion and the second portion, wherein the intermediate layer wears and becomes at least partially de-bonded from the first portion during operation of the gas turbine engine, and
wherein the intermediate layer becomes completely worn away during operation of the gas turbine engine.

* * * * *